US009614751B2

(12) United States Patent
Sekiya et al.

(10) Patent No.: US 9,614,751 B2
(45) Date of Patent: Apr. 4, 2017

(54) OPTICAL PATH COMPUTATION BASED ON A REACHABILITY MATRIX (71) Applicant: Fujitsu Limited, Kawasaki-shi, Kanagawa (JP)

(72) Inventors: Motoyoshi Sekiya, Richardson, TX (US); Martin Bouda, Plano, TX (US); Xi Wang, Murphy, TX (US); Qiong Zhang, Plano, TX (US); Chengyi Gao, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 14/169,980

(22) Filed: Jan. 31, 2014

(65) Prior Publication Data
US 2014/0308040 A1 Oct. 16, 2014

Related U.S. Application Data (60) Provisional application No. 61/810,520, filed on Apr. 10, 2013.

(51) Int. Cl.
H04J 14/02 (2006.01)
H04L 29/00 (2006.01)
H04L 12/721 (2013.01)
H04L 12/705 (2013.01)

(52) U.S. Cl.
CPC .......... H04L 45/14 (2013.01); H04J 14/0269 (2013.01); H04L 45/12 (2013.01); H04L 45/18 (2013.01)

(58) Field of Classification Search
CPC ......... H04L 45/12; H04L 45/14; H04L 45/18; H04J 14/0269
See application file for complete search history.

(56) References Cited

U.S. PATENT DOCUMENTS

| 7,372,803 | B2 * | 5/2008 | de Boer et al. ............... 370/217 |
| 8,830,071 | B2 * | 9/2014 | Borth et al. ............... 340/573.2 |
| 2006/0215544 | A1 * | 9/2006 | Asa et al. .................... 370/216 |
| 2008/0154862 | A1 | 6/2008 | Henriot ............... 707/3 |
| 2010/0104281 | A1 * | 4/2010 | Dhillon et al. ................. 398/45 |
| 2010/0329120 | A1 | 12/2010 | Zhang et al. ................. 370/238 |
| 2012/0213520 | A1 | 8/2012 | Doverspike et al. .......... 398/79 |
| 2012/0308224 | A1 * | 12/2012 | Li et al. ............................ 398/5 |
| 2013/0236176 | A1 * | 9/2013 | Doverspike et al. .......... 398/57 |

OTHER PUBLICATIONS

T. Cormen, "Introduction to Algorithms", p. 562-564, 2009.
Provencher, Operations Automation Using NETSMART 1500 Element Manager, Fujitsu Sci. Tech. J., vol. 45, No. 4, pp. 422-430, Mar. 26, 2009.

(Continued)

Primary Examiner — Leslie Pascal
(74) Attorney, Agent, or Firm — Baker Botts L.L.P.

(57) ABSTRACT

Methods and systems for optical path computation based on a reachability matrix may rely on matrix multiplication to determine a number and respective network locations of regenerators for establishing an end-to-end reachable path in an optical network between a source node and a destination node. The reachability matrix may specify directly reachable optical paths between nodes in the optical network.

20 Claims, 9 Drawing Sheets (56) References Cited

OTHER PUBLICATIONS

X. Wang et al., "Reachability Matrix-based Path Computation using Matrix-Self-Multiplication", Proc. ECOC, p. 5.16, London (2013).
P. Hart et al., "A formal basis for the heuristic determination of minimum cost paths", IEEE Trans. No. Systems Science and Cybernetics, 4:100-107, 1968.
R. Bauer et al., "Combining Hierarchical and Goal-Directed Speed-Up Techniques for Dijkstra's Algorithm", Proc. WEA, Cape Cod, 2008.
U.S. Appl. No. 14/596,007; "Memory-Efficient Matrix-Based Optical Path Computation"; 47 pages, filed Jan. 13, 2015.
M. Bouda et al., "Reachability matrix and directed search-based optical path computation for large optical networks", ECOC 2014, p. 6.17, 3 pages, Sep. 2014.
U.S. Appl. No. 14/595,979; "Hierarchical Guided Search for N-Tuple Disjoint Optical Paths"; 47 pages, filed Jan. 13, 2015.
Farrel, A., et al., "A Path Computation Element (PCE)-Based Architecture," Network Working Group, 40 pgs, Aug. 2006.
Jane M. Simmons, "Optical Network Design and Planning", Springer, 1st Edition, pp. 74-77, Jun. 2, 2008.
Non-Final Office Action, U.S. Appl. No. 14/595,979; 14 pages, May 9, 2016.

\* cited by examiner

| | A | B | C |
|---|---|---|---|
| A | 1 | 1 | 0 |
| B | 0 | 1 | 1 |
| C | 0 | 0 | 1 |

| | A | B | C |
|---|---|---|---|
| A | 1 | 1 | 1 |
| B | 0 | 1 | 1 |
| C | 0 | 0 | 1 |

|   | A | B | C | D |
|---|---|---|---|---|
| A | 1 | 1 | 0 | 0 |
| B | 0 | 1 | 1 | 0 |
| C | 0 | 0 | 1 | 1 |
| D | 0 | 1 | 0 | 1 |

|   | A | B | C | D |
|---|---|---|---|---|
| A | 1 | 1 | 1 | 0 |
| B | 0 | 1 | 1 | 1 |
| C | 0 | 1 | 1 | 1 |
| D | 0 | 1 | 1 | 1 |

| | A | B | C | D |
|---|---|---|---|---|
| A | 1 | 1 | 1 | 0 |
| B | 0 | 1 | 0 | 1 |
| C | 0 | 0 | 1 | 1 |
| D | 0 | 0 | 0 | 1 |

| | A | B | C | D |
|---|---|---|---|---|
| A | 1 | 1 | 1 | 1 |
| B | 0 | 1 | 0 | 1 |
| C | 0 | 0 | 1 | 1 |
| D | 0 | 0 | 0 | 1 |

OPTICAL PATH COMPUTATION BASED ON A REACHABILITY MATRIX

RELATED APPLICATION

This application claims the benefit under 35 U.S.C. §119 (e) of U.S. Provisional Application Ser. No. 61/810,520 filed Apr. 10, 2013 entitled "REACHABILITY-MATRIX-BASED OPTICAL PATH COMPUTATION".

BACKGROUND

Field of the Disclosure

The present disclosure relates generally to optical communication networks and, more particularly, to optical path computation based on reachability matrices.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

The function of computation of an optical signal path through the various network elements is a core function for design, modeling, management, and control of optical networks. Optical path computation may enable operators of an optical network to customize, control and update network policies. One feature of optical path computation involves determination of end-end reachable optical paths from a source node to a destination node. When the source node and the destination node are determined to be 'directly reachable', then one or more paths exist in the optical network between the source node and the destination node that are all-optical paths.

Absent direct reachability from the source node to the destination node, an optical signal will be electrically regenerated using optical-electrical-optical (O-E-O) regenerators along a given signal path, which may involve greater network resources and may be less cost effective. When regenerators are used, an end-end reachable path may include a certain number of regenerators between the source node and the destination node. Thus, one challenging goal in optical path computation may be finding an end-end reachable path that includes a minimum or a specified number of regenerators, in addition to satisfying other path constraints, for example, such as a desired level of signal latency and/or cost.

SUMMARY

In one aspect, a disclosed method for optical path computation in an optical network includes generating a reachability matrix representing nodes in the optical network and direct directional paths between node pairs. A first node in the optical network may correspond to a first row and a first column in the reachability matrix. A second node in the optical network may correspond to a second row and a second column in the reachability matrix. The reachability matrix may include a first value for a row-column pair representing a node pair that is not directly reachable by a network path and may include a second value when the node pair is directly reachable. The reachability matrix may include identity values having the second value for row-column pairs representing the same node. When a value in the first row and in the second column of the reachability matrix is the first value, the method may include multiplying the first row by the second column using matrix multiplication to obtain a first product. When the first product is the second value, the method may include determining that one regenerator provides reachability from the first node to the second node. The first value and the second value may represent boolean values.

In particular embodiments, when the first product is the first value, the method includes performing a self-multiplication on the reachability matrix to generate a resultant matrix, and successively repeating multiplying the respective resultant matrix by the reachability matrix until a resultant value corresponding to a matrix location of the first product is the second value. In certain embodiments, the method may include successively repeating multiplying the respective resultant matrix by the reachability matrix until the respective resultant matrix does not change. The method may further include recording a number of matrix multiplication operations performed, and determining a number of regenerators for reachability from the first node to the second node based on the number of matrix multiplication operations.

Additional disclosed aspects for optical path computation in an optical network include a system comprising a processor and non-transitory computer readable memory media storing processor-executable instructions, as well as a control plane system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
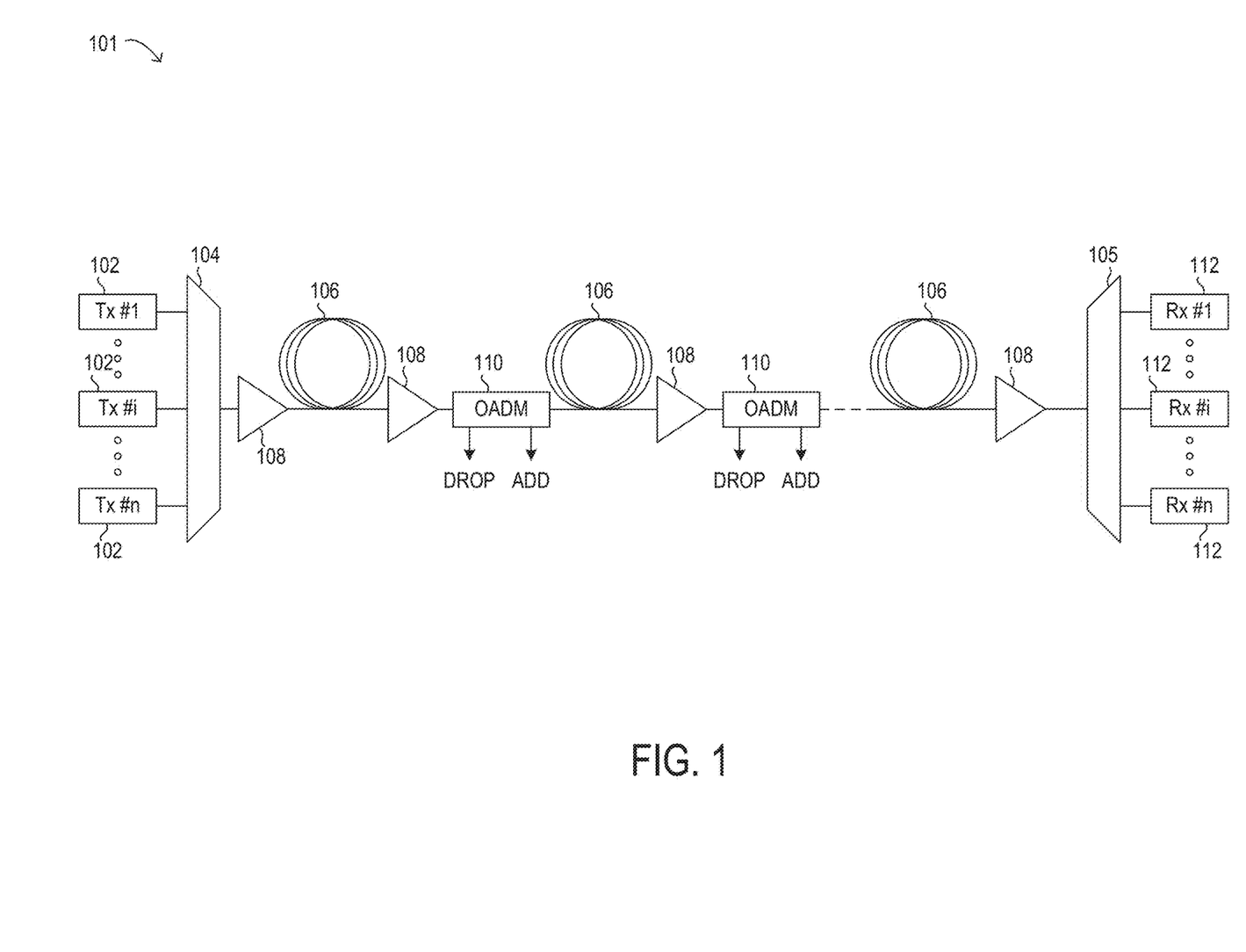
FIG. 1 is a block diagram of selected elements of an embodiment of an optical network.

Turning now to the drawings, FIG. 1 illustrates an example embodiment of optical network 101. As shown, optical network 101 may depict a transport plane view including elements that carry user data and comprise network equipment. Accordingly, optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 may comprise thin strands of glass capable of communicating the signals over long distances with very low loss. Optical fibers 106 may comprise any suitable type of fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within optical network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). In various embodiment, other suitable amplifiers, such as a semiconductor optical amplifier (SOA), may be used.

OADMs 110 may be coupled to optical network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination. In certain embodiments of optical network 101, OADM 110 may represent a reconfigurable OADM (ROADM) that is capable of adding or dropping individual or multiple wavelengths of a WDM signal carrying data channels to be added or dropped in the optical domain, for example, using a wavelength selective switch (WSS).

Optical network 101 may also include one or more demultiplexers 105 at one or more destinations of optical network 101. Demultiplexer 105 may comprise any system apparatus or device that may act as a demultiplexer by splitting a single WDM signal into its individual channels. For example, optical network 101 may transmit and carry a forty channel DWDM signal. Demultiplexer 105 may divide the single, forty channel DWDM signal into forty separate signals according to the forty different channels.

Optical network 101 may also include receivers 112 coupled to demultiplexer 105. Each receiver 112 may be configured to receive signals transmitted in a particular wavelength or channel, and process the signals for the information that they contain. Accordingly, optical network 101 may include at least one receiver 112 for every channel of the network.

Optical networks, such as optical network 101, may further employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal may be conveyed by modulating the phase of a reference signal, also known as a carrier wave, or simple, a carrier. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

In an optical communications network, such as optical network 101, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted. Additionally optical network 101 may include additional elements not expressly shown, such as a dispersion compensation module. Also, as mentioned above, although depicted as a point-to-point network, optical network 101 may comprise any suitable network for transmitting optical signals such as a ring or mesh network.

Figure 2:
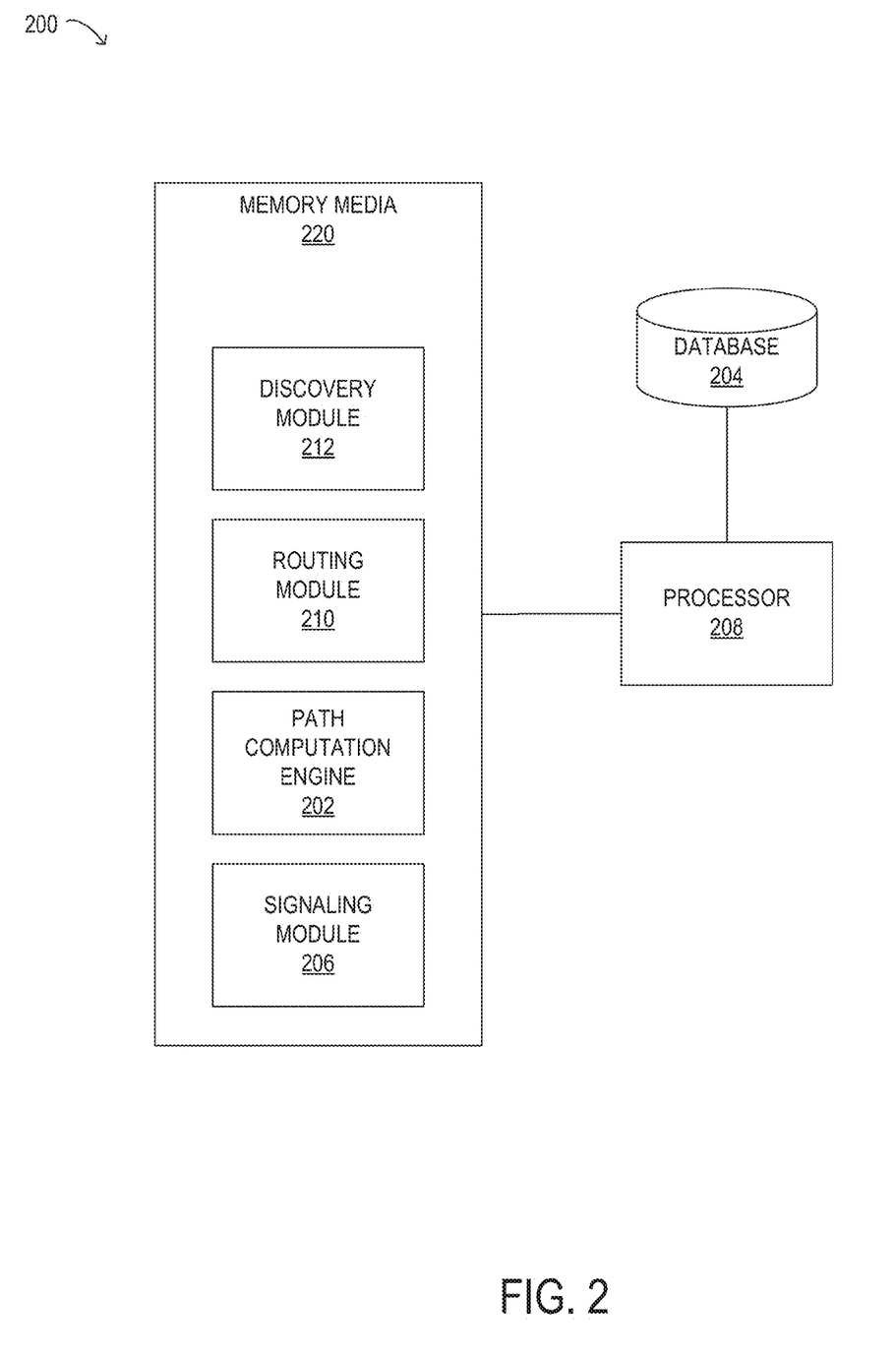
FIG. 2 is a block diagram of selected elements of an embodiment of a control system for an optical network.

Turning now to FIG. 2 a block diagram of selected elements of an embodiment of control system 200 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions and/or code for implementing various algorithms according to the present disclosure.

In certain embodiments, control system 200 may be configured to interface with a person (i.e., a user) and receive data about the optical signal transmission path. For example, control system 200 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device and/or a network element (not shown in FIG. 2).

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to, fiber type; fiber length; number and/or type of components; data rate; modulation format of the data; input power of the optical signal; number of signal carrying wavelengths (i.e., channels); channel spacing; traffic demand; and/or network topology, among others.

As shown in FIG. 2, routing module 210 may be responsible for propagating link connectivity information to various nodes within an optical network, such as optical network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical network 101. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, a feature of optical path computation may include the calculation of end-to-end reachable paths. As noted previously, a directly reachable path may represent a path between a source node and a destination node in an optical network for which an optical signal between the source node and the destination node may be transmitted and received through purely optical components. Such a directly reachable path may stand in contrast, for example, to an indirectly reachable path between the source node and the destination node that involves electrically regenerating the optical signal using O-E-O regenerators, referred to herein as simply 'regenerators', before reaching the destination. An indirectly reachable path may include a plurality of regenerators. Thus, an end-to-end reachable path may include a path from a source node, to a first regenerator node, to at least one second regenerator node, and finally, to a destination node. Path computation engine 202 may be configured to find end-to-end reachable paths that integrate a minimum and/or an otherwise-specified number of regenerators, as well as satisfying other path constraints such as latency and/or cost.

Path computation engine 202 may further be configured to perform graph transformation to determine end-to-end reachable path computation. Graph transformation may include adding virtual links to a physical topology determined originally from physical components of the optical network. A virtual link may represent a link connecting two nodes, such that the two nodes are optically reachable without an intervening regenerator. After all virtual links connecting optically reachable node pairs have been added to the graph topology, the original topology may be transformed into a reachability graph, upon which least-hop routing may be performed to obtain end-to-end reachable paths requiring a minimum number of regenerators. To perform such functionality, a computationally-heavy path algorithm may be employed by path computation engine 202 to obtain the desired number and type of reachable paths. However, configuring path computation engine 202 to perform such graph transformation-based end-to-end reachable path computation may involve extensive use of graph theory and routing algorithms, which are complex and burdensome to manipulate.

The inventors of the present disclosure have discovered that path computation engine 202 may be configured to perform a reachability-matrix-based optical path computation that is based on matrix operations, rather than relying on graph transformation. As will be described in further detail, path computation engine 202 may be configured to perform the optical path computation based on matrix operations using reachability matrices to represent corresponding reachability graphs, and may thus avoid complex graph transformation and routing algorithms. By employing the optical path computation based on reachability matrices, path computation engine 202 may be configured with reduced optical engineering complexity. Furthermore, path computation engine 202 may centralize optical path computation functionality for various parts of optical network 101. In addition, path computation engine 202 may provide an abstracted optical network view to control system 200 for enabling software-defined networks (SDN) in optical network 101. Although control system 200 and path computation engine 202 are depicted in FIG. 2 as singular elements, it will be understood that optical path computation based on matrix operations using reachability matrices, as described herein, performed by path computation engine 202 may be modularized and implemented and deployed in a scalable and/or parallel manner across multiple devices (not shown) to support path computation in optical networks of varying size and/or node complexity.

Figure 3:
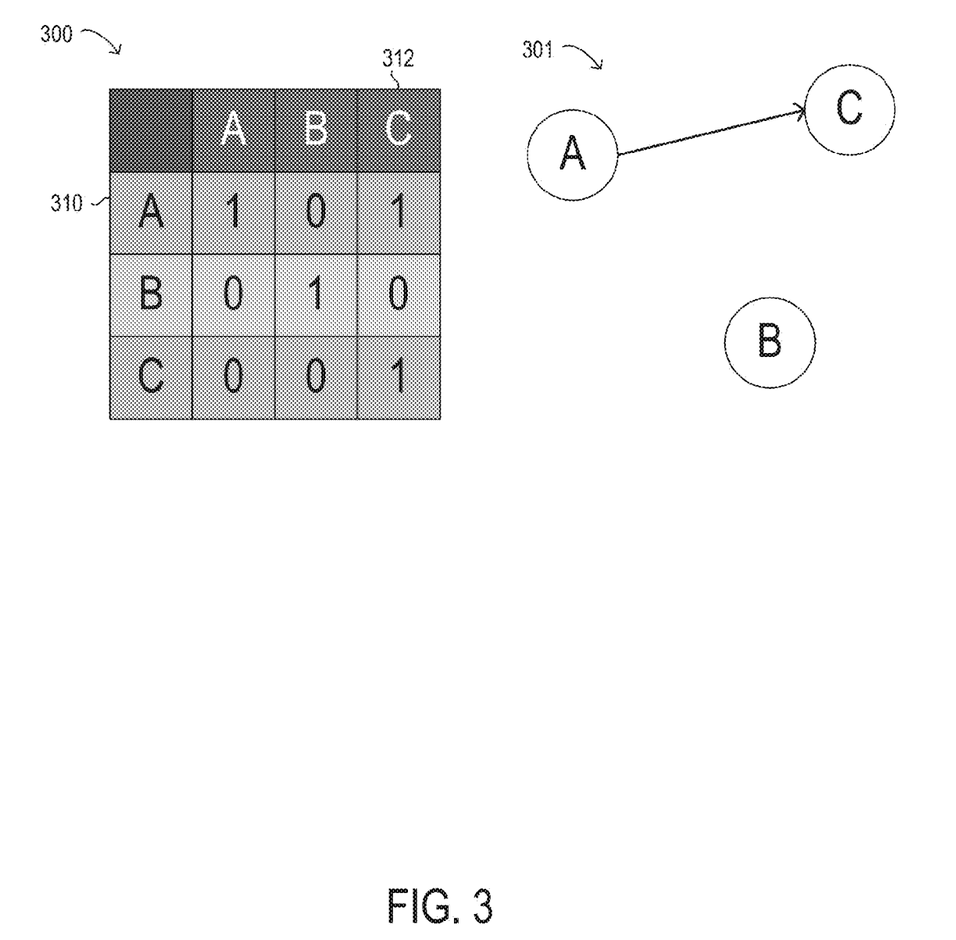
FIG. 3 is a diagram of selected elements of an embodiment of a reachability matrix and a reachability graph.
Figure 4A:
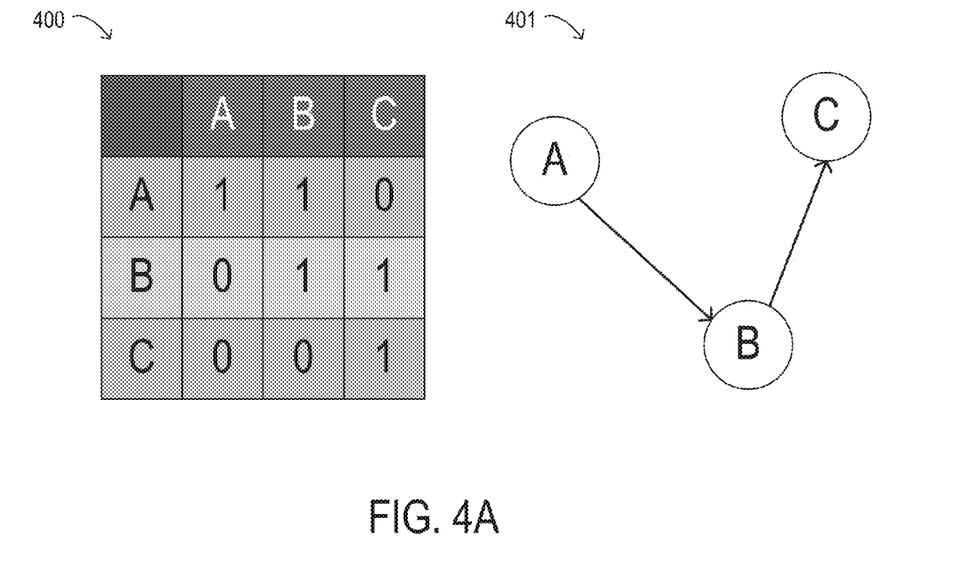
FIG. 4A is a diagram of selected elements of an embodiment of a reachability matrix and a reachability graph.
Figure 4B:
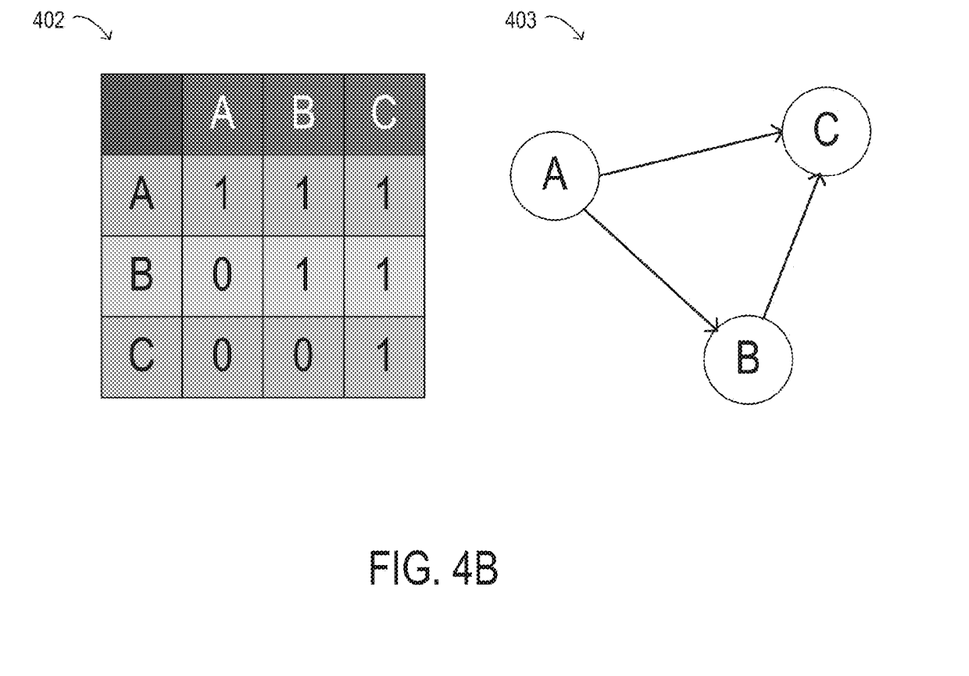
FIG. 4B is a diagram of selected elements of an embodiment of a resultant matrix and a reachability graph.

Turning now to FIGS. 3 and 4A and 4B, block diagrams of selected elements of an embodiment of reachability matrices and corresponding reachability graphs for optical path computation based on matrix operations are illustrated. FIG. 3 depicts reachability matrix 300 corresponding to reachability graph 301, while FIGS. 4A and 4B depict a logical matrix multiplication operation on reachability matrix 400 to obtain resultant matrix 402, showing where a regenerator may be used.

A reachability matrix (RM) may be used to represent a direct (i.e., all optical) reachability relationship between a source and destination node pairs, which may represent nodes of optical network 101. In various embodiments, the reachability matrix may employ boolean values to represent reachability relationships. For example, when source node A and destination node B are directly reachable with respect to each other, the corresponding reachability matrix element value may be "1"; otherwise, the reachability matrix element value may be "0". Each matrix element with value "1" may collectively represent a plurality of pre-calculated direct reachable paths, when present, between a node pair. Such a convention for using either 0 or 1 (or other boolean representations) for each element in a reachability matrix may be referred to as a digital or logical matrix representation. In different embodiments, other symbols may be used to represent boolean values, such as true, T, high, false, F, and low, as examples. Furthermore, other representations that may be interpreted as boolean values, such as a 0 value for boolean false and numeric values greater than 1 for boolean true, may be used in various embodiments.

In FIG. 3, reachability matrix 300 is populated with values to correspond to reachability graph 301. In reachability matrix 300, rows 310 may represent a source node, while columns 312 may represent a destination node. As shown in reachability graph 301, for three nodes A, B, and C, one direct reachable path A→C exists. Therefore, a corresponding value of 1 is recorded in row A and column C for the path A→C. In addition, since each node is self-reachable by definition, reachability matrix 300 includes identity values of 1 for paths A→A, B→B, and C→C. It is noted that when matrix 300 is symmetrical (not shown) with respect to the identity values, matrix 300 may describe both directions of bidirectional reachable paths. Thus, for purposes of optical path computation, reachability matrix 300 may provide the same path information as reachability graph 301. Although depicted in FIG. 3 for a three-node network, it will be appreciated that reachability matrix 300 may be used in the manner described for various networks of differing complexity, resulting in various sizes for reachability matrices.

When a node pair is not directly reachable, path computation engine 202 may be configured to utilize matrix self-multiplication to deterministically identify a number of regenerators, candidate regenerator nodes, and possible end-to-end reachable paths for the node pair. For example, when after two times of reachability matrix self-multiplications, a matrix element value corresponding to a link from source node A to destination node B changes from 0 to 1, it may be assumed that at least two regenerators are needed for an indirect optical path from source node A to reach destination node B. By back-tracking intermediate resultant matrix self-multiplication results, an individual matrix multiplication step and specific resultant matrix elements involved in a particular value change may be determined. The location of a value change during successive multiplication steps in the resultant matrices may indicate which node may be chosen for a given regenerator node. Path computation engine 202 may be configured to determine partial reachable paths from corresponding resultant matrix elements (e.g., from source node A to a first regenerator node, from the first regenerator node to a second regenerator node, from the second regenerator node to destination node B). Path computation engine 202 may use such information to determine partial reachable paths between regenerator nodes and then concatenate the partial reachable paths to form a set of possible end-to-end reachable paths.

An example of matrix multiplication will now be illustrated. Let matrices M1 and M2 be given in table form as:

| Matrix M1 | |
|---|---|
| a | b |
| c | d |

| Matrix M2 | |
|---|---|
| 1 | 2 |
| 3 | 4 |

A multiplication of M1×M2 will result in matrix M3 given in table form by:

| Matrix M3 = M1 × M2 | |
|---|---|
| a1 + b3 | a2 + b4 |
| c1 + d3 | c2 + d4 |

It is noted that when digital or logical matrix multiplication is performed, the boolean operator AND may be substituted for multiplication, while the boolean operator OR may be substituted for addition. Although the example above is shown with a 2×2 matrix for descriptive clarity, it will be understood that matrix multiplication may be performed with matrices of an arbitrary size. It is noted that a formula for a specific resultant element may be used to generate a multiplicative result for only that element, for example, to multiply a single row by a single column.

Turning now to FIG. 4A, a logical matrix self-multiplication operation is depicted using reachability matrix 400 to obtain resultant matrix 402 in FIG. 4B, with the respective corresponding reachability graphs 401 and 403. Matrix 400 and matrix 402 are populated with boolean numbers and use 0 values for no reachability and 1 values for direct reachability. It is noted that in other embodiments, different symbols may be used to represent boolean values in matrix 400 and/or matrix 402. In FIG. 4A, reachability matrix 400 is populated with boolean values to correspond to reachability graph 401. Specifically, reachability matrix 400 indicates two directional paths, A→B and B→C, as shown in corresponding reachability graph 401. Then, an optical path computation request may be received for a directional path A→C. Based on the optical path computation request for path A→C, row A of reachability matrix 400 may be multiplied by column C of reachability matrix 400, representing a self-multiplication matrix operation, which results in a value of 1 for element (A, C) in resultant matrix 402. The change in value of element (A, C) from 0 to 1 after the first self-multiplication performed on reachability matrix 400 may indicate that one regenerator is needed to reach C from A.

Furthermore, given the constraint that A→B→C apparent from reachability matrix 400, it may be deduced that the one regenerator is to be located at node B. Thus, the result of one regenerator at B for the end-to-end path A→C for reachability graph 401 may be obtained using an optical path computation based on reachability matrix 400 without the use of graph theory or specialized routing algorithms.

Figure 5A:
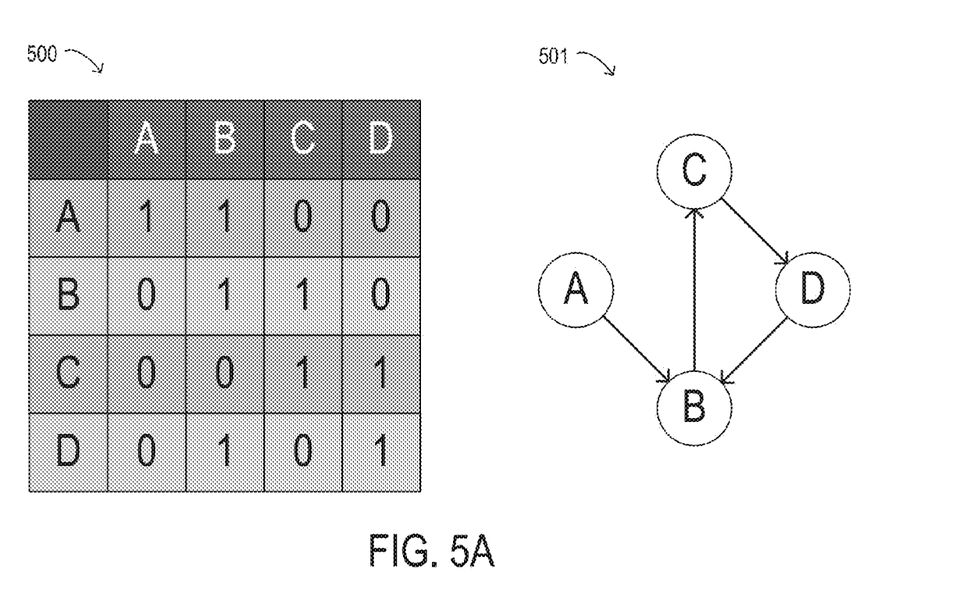
FIG. 5A is a diagram of selected elements of an embodiment of a reachability matrix and a reachability graph.
Figure 5B:
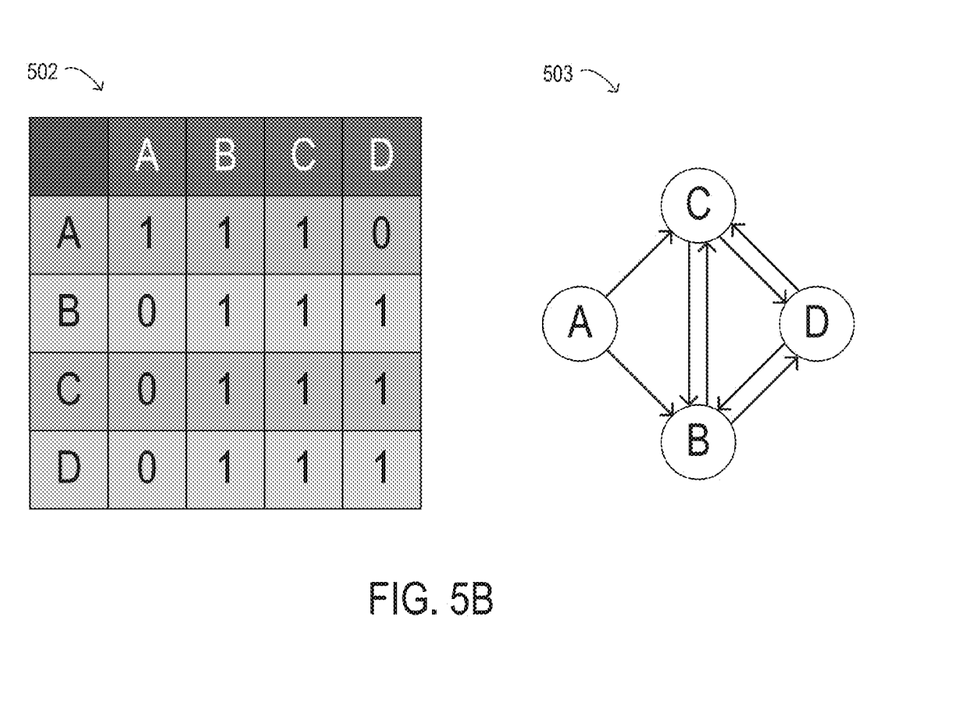
FIG. 5B is a diagram of selected elements of an embodiment of a resultant matrix and a reachability graph.
Figure 5C:
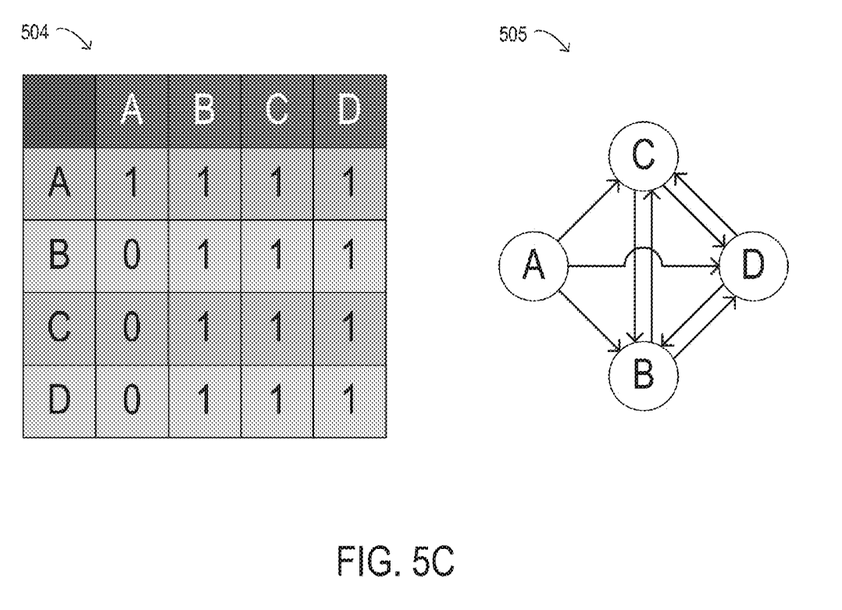
FIG. 5C is a diagram of selected elements of an embodiment of a resultant matrix and a reachability graph.

Advancing now to FIGS. 5A, 5B, and 5C, block diagrams of selected elements of an embodiment of reachability matrices and corresponding reachability graphs for optical path computation based on matrix operations are illustrated. Matrices 500, 502, and 504 are populated with boolean numbers and use 0 values for no reachability and 1 values for direct reachability. It is noted that in other embodiments, different symbols may be used to represent boolean values in matrix 500 and/or matrix 502 and/or matrix 504. FIGS. 5A, 5B and 5C depict a logical matrix multiplication operation on reachability matrix 500 to obtain resultant matrices 502 and 504, successively, showing where two regenerators may be used.

In FIG. 5A, a logical matrix self-multiplication operation is depicted using reachability matrix 500 to obtain resultant matrix 502 in FIG. 5B, with the respective corresponding reachability graphs 501 and 503. In FIG. 5A, reachability matrix 500 is populated with boolean values to correspond to reachability graph 501. Specifically, reachability matrix 500 indicates four directional paths, A→B, B→C, C→D, and D→B as shown in corresponding reachability graph 501. Then, an optical path computation request may be received for a directional path A→D. Based on the optical path computation request for path A→D, row A of reachability matrix 500 may be multiplied by column C of reachability matrix 500, representing a self-multiplication matrix operation, which results in a value of 1 for element (A, C) in resultant matrix 502. The change in value of element (A, C) from 0 to 1 after the first self-multiplication performed on reachability matrix 500 may indicate that one regenerator is needed to reach C from A. Then, in FIG. 5C, resultant matrix 502 is multiplied by reachability matrix 500 to result in resultant matrix 504, representing a successive matrix self-multiplication that results in a value of 1 for element (A, D). The change in value of element (A, D) from 0 to 1 after the second self-multiplication performed on reachability matrix 500 may indicate that two regenerators are needed to reach D from A.

Furthermore, given the constraint that A→B→C→D apparent from reachability matrix 500, it may be deduced that the two regenerators are to be located at nodes B and C. Thus, the result of two regenerators at B and C for the end-to-end path A→D for reachability graph 501 may be obtained using an optical path computation based on reachability matrix 500 without the use of graph theory or specialized routing algorithms.

Figure 6A:
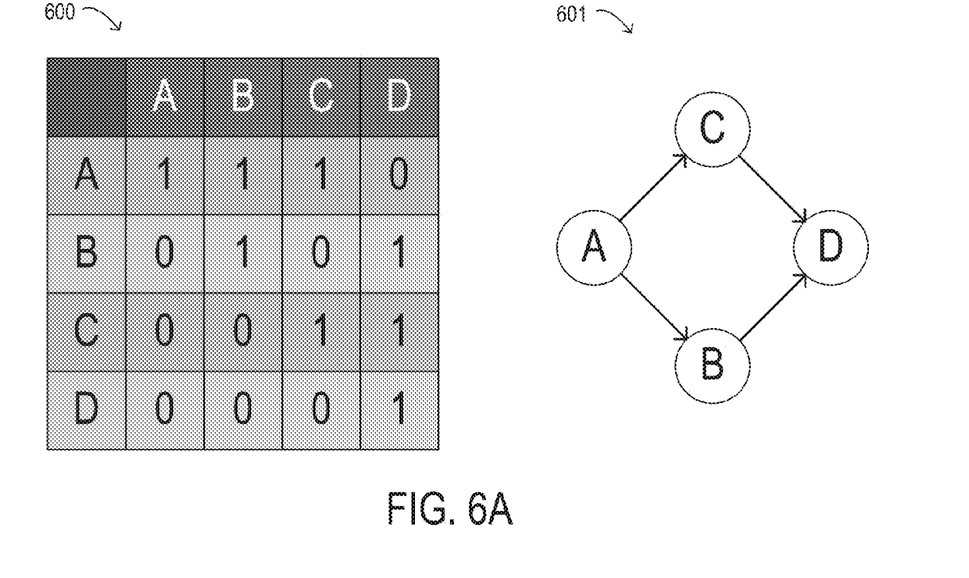
FIG. 6A is a diagram of selected elements of an embodiment of a reachability matrix and a reachability graph.
Figure 6B:
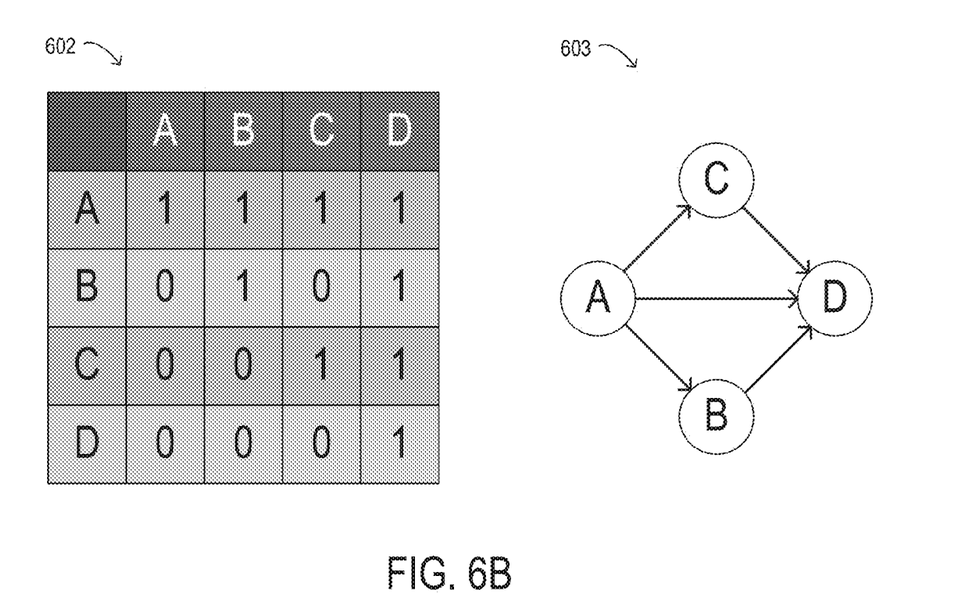
FIG. 6B is a diagram of selected elements of an embodiment of a resultant matrix and a reachability graph.

Referring now to FIGS. 6A and 6B, block diagrams of selected elements of an embodiment of reachability matrices and corresponding reachability graphs for optical path computation based on matrix operations are illustrated. Matrix 600 and matrix 602 are populated with boolean numbers and use 0 values for no reachability and 1 values for direct reachability. It is noted that in other embodiments, different symbols may be used to represent boolean values in matrix 600 and/or matrix 602. FIGS. 6A and 6B depict a logical matrix multiplication operation on reachability matrix 600 to obtain resultant matrix 602, successively, showing where one regenerator may be used at two possible locations.

In FIG. 6A, a logical matrix self-multiplication operation is depicted using reachability matrix 600 to obtain resultant matrix 602 in FIG. 6B, with the respective corresponding reachability graphs 601 and 603. In FIG. 6A, reachability matrix 600 is populated with boolean values to correspond to reachability graph 601. Specifically, reachability matrix 600 indicates four directional paths, A→B, B→D, A→C, and C→D as shown in corresponding reachability graph 601. Then, an optical path computation request may be received for a directional path A→D. Based on the optical path computation request for path A→D, row A of reachability matrix 600 may be multiplied by column D of reachability matrix 600, representing a self-multiplication matrix operation, which results in a value of 1 for element (A, D) in resultant matrix 602. The change in value of element (A, D) from 0 to 1 after the first self-multiplication performed on reachability matrix 600 may indicate that one regenerator is needed to reach D from A.

However, given the constraints that A→B→D and A→C→D apparent from reachability matrix 600, it may be deduced that the one regenerator may be located either at node B or at node C. Thus, the result of one regenerators either at node B or at node C for the end-to-end path A→D for reachability graph 601 may be obtained using an optical path computation based on reachability matrix 600 without the use of graph theory or specialized routing algorithms. When multiple possible paths become evident, a particular path may be chosen in a subsequent operation. For example, redundant and/or duplicate instances of regenerators may be eliminated. In certain embodiments, other criteria, such as cost, distance, etc., may be used to select one of multiple possible optical paths.

The use of logical matrix multiplication to calculate reachable optical paths, as described above with respect to FIGS. 4A, 4B, 5A, 5B, 5C, 6A and 6B, may represent a solution that obtains transitive closure of a reachability graph. The transitive closure of a graph G=(V, E) having vertex set V and edge set E may determine whether there is a path in G from i to j for all vertex pairs i, j ∈ V. The methods and operations described herein, for example as performed by path computation engine 202 (see FIG. 2), may apply and extend transitive closure to optical path computation. Specifically, path computation engine 202 may calculate transitive closure using reachability matrix self-multiplication to obtain reachable (either with or without regenerators) node pairs. Path computation engine 202 may further back-track the process of transitive closure calculation to obtain all end-to-end actual optical paths.

In certain embodiments, path computation engine 202 may populate a reachable path database, such as included in database 204 (see FIG. 2), based on a given network topology and corresponding signal reachability. Such a path database may be pre-calculated by an offline optical link design and validation tool. Furthermore, path computation engine 202 may generate reachability matrices for different transmission types, such as but not limited to different types of line rates, modulation formats, error correction, guardband, latency, etc. in network 101 (see FIG. 1). Additionally, path computation engine 202 may create mappings from reachability and/or resultant matrix elements to corresponding reachable paths.

As noted previously, path computation engine 202 may determine regenerator nodes and end-to-end optical paths between source nodes and destination nodes for a given optical path computation request. Based on the optical path computation request and reachability matrices having desired transmission types, path computation engine 202 may determine regenerator nodes by applying matrix self-multiplication, as described herein. Furthermore, a list of regenerated paths, which may include the source node, regenerator nodes, and the destination node, may be generated by connecting the source node and destination node through a sequence of regenerator nodes, which may be generated by considering different combinations of regenerator nodes.

Path computation engine 202 may further process the resulting regenerated paths to remove duplicate regenerator nodes, which may include duplicate regenerator nodes that may occur when requesting a path with more than a minimum number of regenerator nodes. The resulting regenerated paths may then be processed to form end-to-end optical paths that contain detailed hop-by-hop node information. During this process, invalid paths, such as paths containing loops, containing excluded nodes, etc., may be excluded. Finally, path computation engine 202 may be configured to output the resulting end-to-end optical paths following a preferred order specified by the optical path computation request, such as ordered by a number of regenerators, cost, and/or latency, etc.

Figure 7:
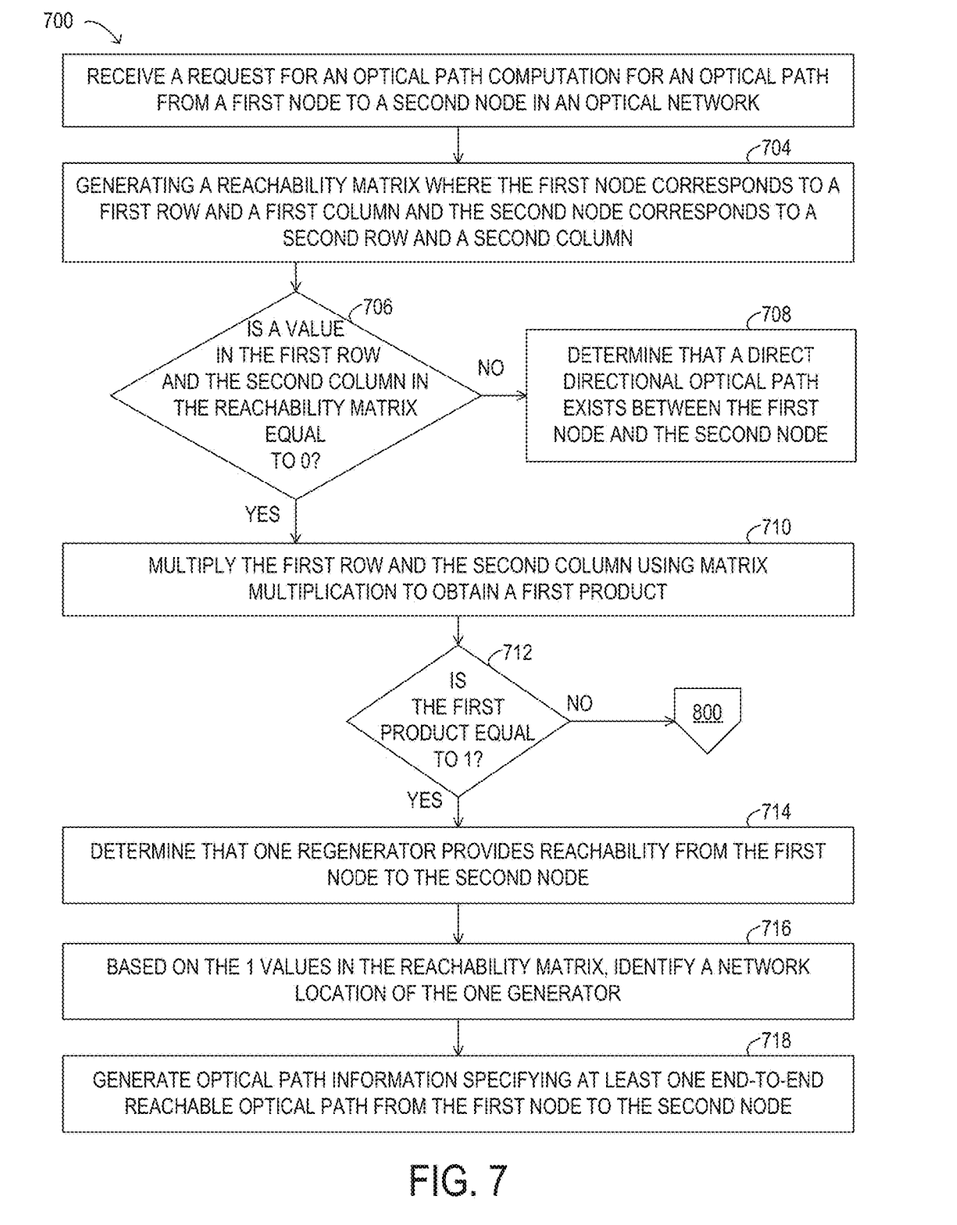
FIG. 7 is a flow chart of selected elements of a method for optical path computation based on a reachability matrix.

Referring now to FIG. 7, a block diagram of selected elements of an embodiment of method 700 for optical path computation based on matrix operations is depicted in flowchart form. Method 700 may be performed using network 101 (see FIG. 1), for example, by using a control plane and/or an optical path computation engine, such as path computation engine 202 (see FIG. 2), associated with network 101. In method 700, 0 values and 1 values are used to represent boolean values. In different embodiments, different symbols may be used to represent boolean values in method 700. It is noted that certain operations described in method 700 may be optional or may be rearranged in different embodiments.

In FIG. 7, method 700 may begin by receiving (operation 702) a request for an optical path computation for an optical path from a first node to a second node in an optical network. Then, a reachability matrix may be generated where the first node corresponds to a first row and a first column and the second node corresponds to a second row and a second column. The reachability matrix may represent nodes in the optical network and direct directional paths between node pairs. The reachability matrix may include a value of 0 for a row-column pair representing a node pair that is not directly reachable by a network path and may include a value of 1 when the node pair is directly reachable. The reachability matrix may include identity values of 1 for row-column pairs representing the same node. Next in method 700, a decision may be made whether a value in the first row and the second column is equal (operation 706) to 0. When the result of operation 706 is NO, method 700 may determine (operation 708) that a direct directional optical path between the first node and the second node exists. When the result of operation 706 is YES, the first row and the second column may be multiplied (operation 710) using matrix multiplication to obtain a first product. Then, in method 700, a decision may be made whether the first product is equal (operation 712) to 1. When the result of operation 712 is NO, method 700 may advance to method 800 (see FIG. 8). When the result of operation 712 is YES, method 700 may determine (operation 714) that one regenerator provides reachability from the first node to the second node. Based on the 1 values in the reachability matrix, a network location of the one generator may be identified (operation 716). Optical path information may be generated (operation 718) specifying at least one end-to-end reachable optical path from the first node to the second node. In certain embodiments, operation 718 may include generating a plurality of end-to-end reachable optical paths. A selection criteria may be applied to the plurality of end-to-end reachable optical paths. The selection criteria may include at least one of: a cost function associated with an end-to-end reachable optical path, an optical transmission distance associated with an end-to-end reachable optical path, and a number of regenerators included in an end-to-end reachable optical path, among other criteria.

Figure 8:
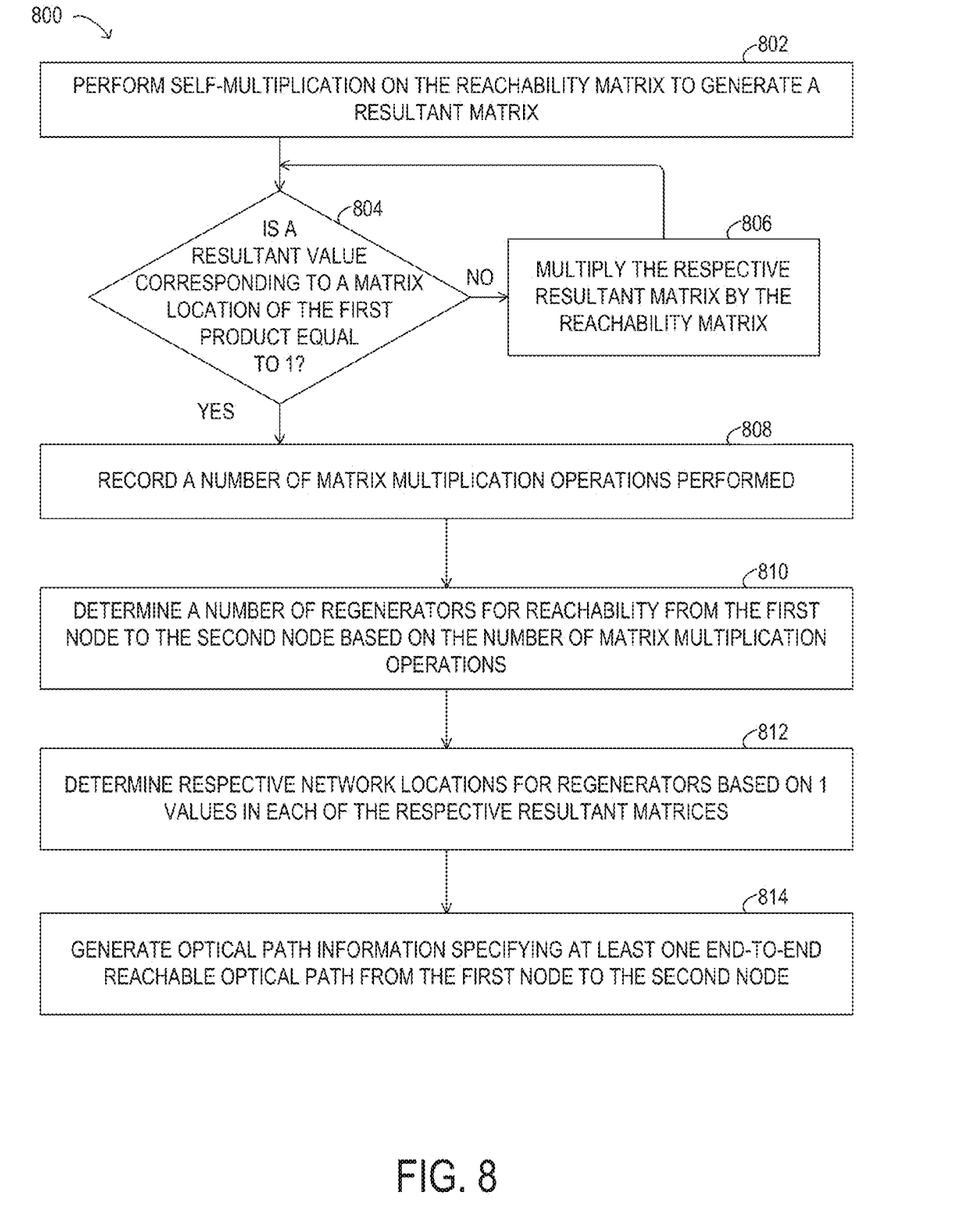
FIG. 8 is a flow chart of selected elements of a method for optical path computation based on a reachability matrix.

Referring now to FIG. 8, a block diagram of selected elements of an embodiment of method 800 for optical path computation based on matrix operations is depicted in flowchart form. Method 800 may be performed using network 101 (see FIG. 1), for example, by using a control plane and/or an optical path computation engine, such as path computation engine 202 (see FIG. 2), associated with network 101. In method 800, 0 values and 1 values are used to represent boolean values. In different embodiments, different symbols may be used to represent boolean values in method 800. It is noted that certain operations described in method 800 may be optional or may be rearranged in different embodiments.

Method 800 may begin by performing self-multiplication (operation 802) on the reachability matrix to generate a resultant matrix. Then, in method 800, a decision may be made whether a resultant value corresponding to a matrix location of the first product is equal (operation 804) to 1. The resultant value is a value in the resultant matrix. In certain embodiments (not shown in FIG. 8) operation 804 may be replaced with a decision whether a particular resultant matrix is equal to a prior resultant matrix. When the result of operation 804 is NO, then the respective resultant matrix may be multiplied (operation 806) by the reachability matrix. The multiplication in operation 806 is a matrix multiplication. After operation 806, method 800 may return to operation 804 in a looping manner. When the result of operation 804 is YES, a number of matrix multiplication operations performed may be recorded (operation 808). A number of regenerators for reachability from the first node to the second node may be determined (operation 810) based on the number of matrix multiplication operations. Respective network location for regenerators based on 1 values in each of the respective resultant matrices may be determined (operation 812). Operation 812 may include identifying resultant matrices that include a 1 in a matrix location where a factor matrix includes a 0 value. In other words, operation 812 may record matrix locations in the resultant matrices where a 0 to 1 transition occurs upon matrix multiplication. It is noted that multiple 0 to 1 transitions may occur in a resultant matrix, which may correspond to multiple regenerators and/or multiple possible network locations for regenerators. Optical path information may be generated (operation 814) specifying at least one end-to-end reachable optical path from the first node to the second node. In certain embodiments, operation 814 may include generating a plurality of end-to-end reachable optical paths. A selection criteria may be applied to the plurality of end-to-end reachable optical paths. The selection criteria may include at least one of: a cost function associated with an end-to-end reachable optical path, an optical transmission distance associated with an end-to-end reachable optical path, and a number of regenerators included in an end-to-end reachable optical path, among other criteria.

As disclosed herein, optical path computation based on a reachability matrix may be modularized to improve usability. Certain operations may be performed independently from operations that depend upon an optical path computation request, such as pre-calculation of the all-optical reachable paths, and/or management of reachability and/or resultant matrices, among others. In certain embodiments, computations associated with generating resultant matrices, or portions thereof, may be performed using parallelized computational resources, such as multiple threads executing in parallel or parallel processor resources. For example when optical path computation requests specify multiple data rates and/or modulation formats, multithreading may be used for optical path computation based on a reachability matrix.

Accordingly, in some embodiments, optical path computation based on a reachability matrix may support mixed formats of optical signals. For example, an optical path computation request for 100 gigabytes per second (100 G) from a source node to a destination node and allowing for mixed format transmission may be satisfied with a first and second all-optical path. The first all-optical path from the source node to a first regenerator may employ an optical signal modulation format of 100 G DP-QPSK, while the second all-optical path from the first regenerator to the destination node may use a 100 G 16-QAM modulation format. Also, using a simple OR operation between the matrix for 100 G DP-QPSK and 100 G 16-QAM, a new matrix supporting 100 G DP-QPSK/100 G 16-QAM for this path computation may be obtained.

In particular embodiments, optical path computation based on a reachability matrix may support optical path computation requests specifying certain regenerator properties. For example, an optical path computation request for an optical path may specify allowing up to two extra regenerators than a minimum number of regenerators. A further criteria for the optical path computation request may be to keep a latency at a minimum value. In some embodiments, the optical path computation request may designate certain preferred regenerator sites.

As disclosed herein, methods and systems for optical path computation based on a reachability matrix may rely on matrix multiplication to determine a number and respective network locations of regenerators for establishing an end-to-end reachable path in an optical network between a source node and a destination node. The reachability matrix may specify directly reachable optical paths between nodes in the optical network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for optical path computation in an optical network, comprising:
    generating, by a path computation engine included in a control system for implementing control plane functionality in the optical network, a reachability matrix representing nodes in the optical network and direct directional paths between node pairs, wherein a first node in the optical network corresponds to a first row and a first column in the reachability matrix, wherein a second node in the optical network corresponds to a second row and a second column in the reachability matrix, wherein a third node in the optical network corresponds to a third row and a third column in the reachability matrix, wherein the reachability matrix includes a first value for a row-column pair representing a node pair that is not directly reachable by a network path and includes a second value when the node pair is directly reachable, and wherein the reachability matrix includes identity values having the second value for row-column pairs representing the same node;
    when a value in the first row and in the third column of the reachability matrix is the first value, multiplying, by the path computation engine, the first row by the third column using matrix multiplication to obtain a first product;
    when the first product is the second value, determining that one regenerator provides reachability from the first node to the third node,
    wherein the first value and the second value represent boolean values;
    determining a network path based on the reachability matrix; and
    transmitting, via a signaling protocol, information regarding the network path to nodes in the optical network to establish a network service associated with the network path.

2. The method of claim 1, wherein the reachability matrix is symmetrical with respect to the identity values.

3. The method of claim 1, when the first product is the first value, further comprising:
    performing a self-multiplication on the reachability matrix to generate a resultant matrix;
    successively repeating multiplying the respective resultant matrix by the reachability matrix until a resultant value corresponding to a matrix location of the first product is the second value;
    recording a number of matrix multiplication operations performed; and
    determining a number of regenerators for reachability from the first node to the third node based on the number of matrix multiplication operations.

4. The method of claim 3, further comprising:
    successively repeating multiplying the respective resultant matrix by the reachability matrix until the respective resultant matrix does not change.

5. The method of claim 3, further comprising:
    removing duplicate regenerators from the number of regenerators.

6. The method of claim 3, further comprising:
    based on the determining the number of regenerators, generating optical path information specifying an end-to-end reachable optical path from the first node to the third node; and
    determining respective network locations for regenerators based on the second values in each of the respective resultant matrices.

7. The method of claim 6, wherein generating the optical path information includes:
    removing optical path information for looped paths.

8. The method of claim 6, further comprising:
    generating optical path information specifying a plurality of end-to-end reachable optical paths from the first node to the third node.

9. The method of claim 1, further comprising:
    based on the second values in the reachability matrix, identifying a network location of the one regenerator between the first node and the second node.

10. The method of claim 1, wherein the reachability matrix is generated for nodes having identical values for optical transmission parameters selected from at least one of: data rate, modulation format, error rate, and latency.

11. A system for optical path computation in an optical network, comprising:
    a processor configured to access non-transitory computer readable memory media, wherein the memory media store processor-executable instructions, the instructions, when executed by a processor, cause the processor to execute a path computation engine to:
        generate a reachability matrix representing nodes in the optical network and direct directional paths between node pairs, wherein a first node in the optical network corresponds to a first row and a first column in the reachability matrix, wherein a second node in the optical network corresponds to a second row and a second column in the reachability matrix, wherein the reachability matrix includes a first value for a row-column pair representing a node pair that is not directly reachable by a network path and includes a second value when the node pair is directly reachable, and wherein the reachability matrix includes identity values having the second value for row-column pairs representing the same node;
        when a value in the first row and in the second column of the reachability matrix is the first value, multiply the first row by the second column using matrix multiplication to obtain a first product;
        when the first product is the second value, determine that one regenerator provides reachability from the first node to the third node,
        wherein the first value and the second value represent boolean values;
        determining a network path based on the reachability matrix; and
        transmitting, via a signaling protocol, information regarding the network path to nodes in the optical network to establish a network service associated with the network path.

12. The system of claim 11, wherein the reachability matrix is symmetrical with respect to the identity values.

13. The system of claim 11, when the first product is the first value, further comprising instructions to:
perform a self-multiplication on the reachability matrix to generate a resultant matrix;
successively repeat multiplying the respective resultant matrix by the reachability matrix until a resultant value corresponding to a matrix location of the first product is the second value;
record a number of matrix multiplication operations performed; and
determine a number of regenerators for reachability from the first node to the third node based on the number of matrix multiplication operations.

14. The system of claim 13, further comprising instructions to:
remove duplicate regenerators from the number of regenerators.

15. The system of claim 13, further comprising instructions to:
based on the instructions to determine the number of regenerators, generate optical path information specifying an end-to-end reachable optical path from the first node to the third node; and
determine respective network locations for regenerators based on the second values in each of the respective resultant matrices.

16. The system of claim 15, wherein the instructions to generate the optical path information further comprise instructions to:
generate optical path information specifying a plurality of end-to-end reachable optical paths from the first node to the third node.

17. The system of claim 15, wherein the instructions to generate the optical path information include instructions to:
remove optical path information for looped paths.

18. The system of claim 13, further comprising instructions to:
successively repeat multiplying the respective resultant matrix by the reachability matrix until the respective resultant matrix does not change.

19. The system of claim 11, further comprising instructions to:
based on the second values in the reachability matrix, identify a network location of the one regenerator between the first node and the second node.

20. The system of claim 11, wherein the reachability matrix is generated for nodes having identical values for optical transmission parameters selected from at least one of: data rate, modulation format, error rate, and latency.

* * * * *